(12) United States Patent
Brandt et al.

(10) Patent No.: US 7,486,686 B2
(45) Date of Patent: Feb. 3, 2009

(54) METHOD AND APPARATUS FOR SCHEDULING DATA ON A MEDIUM

(75) Inventors: Anders Terje Brandt, Soborg (DK); Niels Peter Svenningsen, Skodsborg (DK); Kai Harrelkilde-Petersen, Malmo (DK)

(73) Assignee: Vitesse Semiconductor Corporation, Camarillo, CA (US)

( * ) Notice: Subject to any disclaimer, the term of this patent is extended or adjusted under 35 U.S.C. 154(b) by 1162 days.

(21) Appl. No.: 10/081,152

(22) Filed: Feb. 25, 2002

(65) Prior Publication Data

US 2002/0167957 A1 Nov. 14, 2002

Related U.S. Application Data

(60) Provisional application No. 60/270,915, filed on Feb. 26, 2001.

(51) Int. Cl.
*H04L 12/28* (2006.01)

(52) U.S. Cl. .................. 370/412; 370/230; 370/235; 370/462; 370/413; 370/418

(58) Field of Classification Search ............ 370/230, 370/231, 232, 235, 412–418, 462
See application file for complete search history.

(56) References Cited

U.S. PATENT DOCUMENTS

| | | | | |
|---|---|---|---|---|
| 5,867,483 A * | 2/1999 | Ennis et al. | ........... | 370/252 |
| 5,917,822 A | 6/1999 | Lyles et al. | | |
| 6,018,527 A | 1/2000 | Yin et al. | | |
| 6,067,301 A * | 5/2000 | Aatresh | ........... | 370/418 |
| 6,075,788 A * | 6/2000 | Vogel | ........... | 370/395.51 |
| 6,134,217 A | 10/2000 | Stiliadis et al. | | |
| 6,246,256 B1 | 6/2001 | Liu et al. | | |
| 6,262,986 B1 * | 7/2001 | Oba et al. | ........... | 370/399 |
| 6,408,005 B1 * | 6/2002 | Fan et al. | ........... | 370/412 |
| 6,438,134 B1 * | 8/2002 | Chow et al. | ........... | 370/412 |
| 6,452,933 B1 * | 9/2002 | Duffield et al. | ........... | 370/415 |
| 6,470,016 B1 * | 10/2002 | Kalkunte et al. | ........... | 370/395.41 |
| 6,657,958 B1 * | 12/2003 | Tanaka | ........... | 370/230.1 |
| 6,735,219 B1 * | 5/2004 | Clauberg | ........... | 370/474 |
| 6,810,031 B1 * | 10/2004 | Hegde et al. | ........... | 370/351 |
| 6,839,358 B2 * | 1/2005 | Abiru et al. | ........... | 370/413 |
| 6,895,012 B2 * | 5/2005 | Amou et al. | ........... | 370/395.4 |
| 6,920,109 B2 * | 7/2005 | Yazaki et al. | ........... | 370/230.1 |
| 6,950,396 B2 * | 9/2005 | Assa et al. | ........... | 370/230.1 |
| 6,952,424 B1 * | 10/2005 | Bass et al. | ........... | 370/412 |

(Continued)

FOREIGN PATENT DOCUMENTS

EP 1104219 5/2001

(Continued)

*Primary Examiner*—Edan Orgad
*Assistant Examiner*—Andrew C Lee
(74) *Attorney, Agent, or Firm*—Klein, O'Neill & Singh, LLP (57) ABSTRACT

A bandwidth guaranteeing, BW, process transmits data from a first group of queues to a medium. When none of the queues of the first group wishes to transmit data via the bandwidth guaranteeing process, a weighted fair queuing process is provided for dividing any excess bandwidth between a second group of queues. A mathematically simple WFQ process is described which may be interrupted by the BW process and resumed with the same order etc. between the queues.

12 Claims, 8 Drawing Sheets

U.S. PATENT DOCUMENTS

| | | | |
|---|---|---|---|
| 6,959,002 B2 * | 10/2005 | Wynne et al. | 370/412 |
| 6,977,895 B1 * | 12/2005 | Shi et al. | 370/235 |
| 7,016,366 B2 * | 3/2006 | Kawarai et al. | 370/413 |
| 7,023,866 B2 * | 4/2006 | Giroux et al. | 370/412 |
| 2002/0114334 A1 * | 8/2002 | Yang | 370/395.1 |
| 2003/0074507 A1 * | 4/2003 | Weber | 710/240 |

FOREIGN PATENT DOCUMENTS

| | | |
|---|---|---|
| WO | WO98/35465 | 8/1998 |

* cited by examiner

METHOD AND APPARATUS FOR SCHEDULING DATA ON A MEDIUM

This application hereby claims priority under 35 USC §119 on Provisional patent application 60/270,915, the entire contents of which are hereby incorporated herein by reference.

BACKGROUND OF THE INVENTION

The present invention relates to a method and an apparatus/system for implementing weighted fair queuing and in particular weighted byte fairness in an Ethernet network.

A weighted fair queuing in an ATM network may be seen from U.S. Pat. No. 6,018,527 which determines which queue is the next to transmit by determining which queue has the earliest starting time. When transmitting an ATM packet from a queue, the starting time of that queue is updated by adding thereto a constant value.

Quality of Service is also described in EP-A-1,104,219, U.S. Pat. Nos. 6,246,256, 5,917,822, 6,134,217, and WO-A-98/35465. These references describe the use of either bandwidth guaranteeing processes or processes where a given bandwidth is split between a number of users.

Also, a number of the references relate only to fixed-size cells and therefore do not take into account the problem of fair treatment of queues sending cells or packets of differing sizes.

SUMMARY OF THE INVENTION

A method of transmitting information packets from a plurality of queues into a single transmission medium, wherein the packets may have different sizes, the method comprising: a bandwidth guaranteeing process transferring packets from one or more queues to the transmission medium in a manner so that each of those queues can obtain at least a predetermined bandwidth, and a queuing process comprising the steps of: 1. assigning a priority to each of the queues not using the bandwidth guaranteeing process; 2. defining, for each of the queues not using the bandwidth guaranteeing process, a variable, and 3. for the queues not using the bandwidth guaranteeing process, when no queues using the bandwidth guaranteeing process transmit packets; determining a first queue having a variable with a value fulfilling a predetermined criterion, transmitting a packet from the first queue to the transmission medium, and determining a new value for the variable of the first queue, the new value based on a mathematical operation using a previous value for the variable at a point in time prior to transmission of the packet and a factor scaling the priority of the first queue multiplied with a factor relating to a size of the packet transmitted from the first queue, the new value not fulfilling the predetermined criterion.

BRIEF DESCRIPTION OF THE DRAWINGS

In the following, a preferred embodiment of the invention is described with reference to the drawing, wherein.

DETAILED DESCRIPTION

In a first aspect, the invention relates to a method of transmitting information units or packets from a plurality of queues into a single transmission medium, wherein the units or packets may have different sizes, the method comprising:
a bandwidth guaranteeing process transferring units or packets from one or more queues of a first group of the queues to the transmission medium in a manner so that each of those queues can obtain at least a predetermined bandwidth, and
a queuing process comprising the steps of:
1. assigning a priority or quality to each of the queues in a second group of queues,
2. defining, for each of the queues in the second group, a variable, and
3. when no queues transmit units or packets using the bandwidth guaranteeing process:
   determining a queue in the second group having a variable with a value fulfilling a predetermined criterion,
   transmitting a packet or unit from that queue to the transmission medium, and
   determining a new value for the variable of the queue, the new value relating to a mathematical operation using a previous value for the variable at a point in time prior to transmission of the packet or unit and a factor scaling with/relating to the priority or quality of the queue multiplied with a factor relating to a size of the packet or unit transmitted from the queue and/or a period of time used for transmitting the packet or unit, where the mathematical operation brings the new value to, compared to the previous value, not fulfil the predetermined criterion.

In this context, a priority or quality of a queue will be a value, which, relative to those of the other queues, defines a ranking vis-à-vis importance of the queues. Naturally, several queues may have the same priority or quality.

In the present context, the factor scaling with or relating to the priority or quality assigned may be either smaller or higher the higher the importance of the queue or the data held thereby. The mathematical operation will be able to take into account any scaling or relation in order to obtain the correct relative change between the value of the transmitting queue and those of the other queues.

The overall effect of the mathematical operation is to bring the value of the transmitting queue to not fulfil, compared to the previous value, the criterion. In this manner, other queues may get to transmit their packets. An alternative would, naturally, be to perform another mathematical operation on all the other queues than the transmitting one in order to bring about the same relative change.

In relation to the determination of the new value, it is important to note the overall function being that the method ensures that longer data packets/units have the effect of providing larger values/offsets and thus a longer delay before that queue is allowed to transmit again. Also, the lower the importance (the higher the priority or quality in the present context), the longer the delay.

The factor scaling with or relating to the priority or quality of the queue (or the data therein) may simply be assigned thereto—or may be derived therefrom by a mathematical operation. Thus, "scaling" will mean any interrelationship—but is preferably the same for all queues. Scaling may be the lifting of a value to any potency, the multiplication with any positive number, or a combination thereof, etc. Alternatively, the higher a priority/quality, the higher a factor may simply be provided—or the lower a factor may be provided.

Naturally, the mathematics or functioning of the invention may be inversed without any degradation of the functioning thereof. Also, preferably all values of the queues are regularly reduced/corrected, such as with the same amount, in order to avoid buffer overflow. This has no impact on the functionality or ranking/timing of the queues.

Units or packets having varying sizes are seen in e.g. the Internet Protocol, such as along the Ethernet standard, the standards of IEEE 802.1, 802.3, Apple Talk, Token Ring, Frame Relay, and FDDI.

Naturally, the transmission medium may be a single medium able to transmit only a single packet or unit at the time or it may be an aggregated or trunk medium, which is able to actually transport a number of packets or units in parallel. The overall method of the invention is equally well suited for handling these situations.

Also, naturally, the bandwidth guaranteeing process can only transmit data packets or units if one or more of the queues of the first group have data to transmit. The same holds true for the queues in the second group and for the queuing process. In this context it should be noted that a queue may be a member of both the first and second groups. This merely indicates that the queue both wishes to have a minimum bandwidth at its disposal—and to be able to burst out more data if required.

A well-known bandwidth guaranteeing process is the Leaky Bucket process where the bandwidth use of each queue is monitored and controlled. Another such process is the Token Bucket process.

The present fair queuing process is able to adapt itself to variations in available bandwidth—that is both variations in the bandwidth use of the bandwidth guaranteeing process and the bandwidth available on the medium. The overall advantage of the values instead of actual time delays is that when using the values, the method becomes independent of changes to the available bandwidth.

Thus, preferably the fair queuing process will define an order according to which packets or units are transmitted from the queues. No absolute timing is preferred in that that requires total knowledge about the bandwidth available in the future.

The hierarchy between the bandwidth guaranteeing process and the fair queuing preferably is so that all queues of the first group are able to use their predetermined bandwidths. If bandwidth is available, such as when the sum of all predetermined bandwidths does not add up to 100% of the bandwidth on the medium, or if one or more of the bandwidth guaranteeing processes does not use its predetermined bandwidth, the "excess" bandwidth is controlled by the fair queuing process.

In the present context, the factor relating to the size of a transmitted packet or the time used for transmitting it may be determined in a number of ways. One way being using the actual size of the packet. Another manner is especially suitable when a number of bits/bytes of the packet are transmitted or handled at the same time, whereby the number of such parts to be handled may be used. This number is not necessarily fully related to the actual size of the packet in that the last part to be handled may not be full. A third manner of determining the factor is one relating to the time used for transmitting the packet. If the packet is transmitted at a constant rate, this time may relate to the size of the packet—or to the number of parts transmitted. However, bandwidths may vary so that these factors may not be fully interrelated. The important factor here is to take the varying sizes of packets into account in order to bring about more fairness when enabling the transmission of packets of differing sizes.

Also, the criterion to be fulfilled will relate to the remaining factors and mathematical operations performed. This criterion will normally be the selection of the largest or lowest of the values. The criterion may vary if there wrap-around of buffers is possible so that it is no longer desirable simply to look for the largest or lowest value. This will be obvious to the skilled person.

The overall philosophy of the fair queueing of the invention is the fact that when a given queue has been selected for transmission, the amount with which its new value will be brought "away" from the previous value fulfilling the criterion will be larger the larger a packet was transmitted. This does not mean that that queue cannot fulfil the criterion taking into account the values of the other queues. Naturally, instead of actually altering the value of the queue, the values of the other queues may be altered as well or instead. The relative change is the important factor.

Step 3 could be performed repeatedly so that it is interrupted by the bandwidth guaranteeing process.

In the preferred embodiment, step 3 comprises: when no queues transmit (or wish to) units or packets using the bandwidth guaranteeing process:

determining a queue in the second group having a variable with a smallest value, transmitting a packet or unit from that queue to the transmission medium, and determining a new value for the variable of the queue, the new value relating to a value for the variable at a point in time prior to transmission of the packet or unit plus a factor scaling with/relating to the priority or quality of the queue multiplied with a factor relating to a size of the packet or unit transmitted from the queue and/or a period of time used for transmitting the packet or unit.

Naturally, this operation may be reversed so that the largest value is sought for and so that the addition is replaced with a subtraction (or an addition to the other values).

Preferably, the step of transmitting the data packet or unit comprises transmitting the packet or unit in accordance with a periodic timing signal and wherein the step of determining the new value for the queue comprises, during transmission and for each period of the timing signal, providing a new value for the variable by performing the predetermined mathematical operation on a previous variable value and a factor scaling with the priority or quality of the queue (preferably the priority or quality itself). A predetermined amount of data may be transmitted in or at each period of the timing signal.

Preferably, step 3 is adapted to be stopped, with a first set of values, when a packet or unit (in the fair queuing process) has been transmitted and a queue from the first group of queues wishes to transmit a packet or unit and to be resumed with a second set of values each corresponding to a value of the first set of values, when none of the queues of the first group wishes to transmit a packet or unit.

In addition or alternatively, step 3 could comprise the step of altering the variables of the queues of the second group in accordance with a predetermined relationship.

This correspondence/relationship may be the identical values or all values subtracted or added a given value (in order to avoid buffer over/underflow). Also, depending on the mathematical operations used, division or multiplication with predetermined values may be used. Preferably, a relation—or at least the order in the view of the criterion—is maintained by this altering.

An interesting embodiment further comprises the step of determining a bandwidth used for at least one of the queues.

This knowledge may be used for a number of things, such as:

where the embodiment further comprises the step of altering, on the basis of the bandwidth used by a queue, a parameter of the bandwidth guaranteeing process for the queue and/or the priority/scaling of the step of determining a new value for the queue and/or where the embodiment further comprises the step of providing information to an operator of the bandwidth used.

In the first situation, the share of the fair queuing bandwidth assigned may be increased or decreased depending on the overall historic bandwidth used—such as by altering the priority/quality, the values, the factor's scaling or the like. An alternative would be to alter values used in the guaranteed bandwidth process. If this process was a leaky bucket process, this might be to alter the drop rate thereof.

The second situation is well suited for billing on the basis of the bandwidth used.

Computational simplicity is achieved when the step of defining the variable comprises defining an integer value relating to a priority or quality of each queue.

A second aspect of the invention relates to an apparatus for transmitting information units or packets from a plurality of queues into a single transmission medium, wherein the units or packets may have different sizes, the apparatus comprising:

bandwidth guaranteeing means for transferring units or packets from one or more queues of a first group of the queues to the transmission medium in a manner so that each of those queues can obtain at least a predetermined bandwidth, and queuing means comprising:
1. means for assigning a priority or quality to each of the queues in a second group of queues,
2. means for defining, for each of the queues in the second group, a variable, and
3. means for, when no queues transmit units or packets using the bandwidth guaranteeing process:
    determining a queue in the second group (having data) having a variable with a value fulfilling a predetermined criterion,
    transmitting a packet or unit from that queue to the transmission medium, and
    determining a new value for the variable of the queue, the new value relating to a mathematical operation using a previous value for the variable at a point in time prior to transmission of the packet or unit and a factor scaling with/relating to the priority or quality of the queue multiplied with a factor relating to a size of the packet or unit transmitted from the queue and/or a period of time used for transmitting the packet or unit, where the mathematical operation brings the new value to, compared to the previous value, not fulfil the predetermined criterion.

Step 3 could be performed continuously so that it is interrupted by the bandwidth guaranteeing process and otherwise overlooks any transmissions in the "excess" bandwidth.

In the preferred embodiment, the means 3 comprise means for: when no queues transmit units or packets using the bandwidth guaranteeing process:
    determining a queue in the second group having a variable with a smallest value,
    transmitting a packet or unit from that queue to the transmission medium, and
    determining a new value for the variable of the queue, the new value relating to a value for the variable at a point in time prior to transmission of the packet or unit plus a factor scaling with/relating to the priority or quality of the queue multiplied with a factor relating to a size of the packet or unit transmitted from the queue and/or a period of time used for transmitting the packet or unit.

Again, the means for transmitting the data packet or unit may comprise means for transmitting the packet or unit in accordance with a periodic timing signal and wherein the means for determining the new value for the queue comprise means for, during transmission and for each period of the timing signal, providing a new value for the variable by performing the predetermined mathematical operation on a previous variable value and a factor scaling with the priority or quality of the queue.

Also, preferably the means 3 are adapted to be stopped, with a first set of values, when a packet or unit has been transmitted and a queue from the first group of queues wishes to transmit a packet or unit and to be resumed with a second set of variables each corresponding to a value of the first set, when none of the queues of the of the first group wishes to transmit a packet or unit.

And, the means 3 could be adapted to alter the variables of the queues of the second group in accordance with a predetermined relationship.

Again, the apparatus could comprise means for determining a bandwidth used for at least one of the queues so that it could comprise means for altering, on the basis of the bandwidth used by a queue, a parameter of the bandwidth guaranteeing means for the queue and/or the priority/scaling of the means for determining a new value for the queue and/or means for providing information to an operator of the bandwidth used.

Also, the means for defining the variable could comprise means for defining an integer value relating to a priority or quality of each queue.

The preferred embodiment of the invention is embodied on a single ASIC further comprising:
    a number of input ports either connected directly to one or more data packet/unit providers, such as one or more networks, or to the individual queues if these are not embodied in the ASIC, and
    at least one output to the medium.

In this situation, all logical circuits providing the above functionality would be on the ASIC. Naturally, the invention may alternatively be embodied in a number of interconnected chips, computers, ASICs or the like—and a number of storage devices may be provided, such as RAM, ROM, PROM, EPROM, EEPROM, hard discs, floppy discs, optical discs, or the like for holding values, data units/packets, queues, and any additional data. In fact, preferably all queues are embodies as linked lists in the same RAM. Finally, any inputting means, such as a keyboard, may be provided for providing the quality/priority data, the predetermined bandwidths etc. This information may also be provided via any of the input ports.

Figure 1:
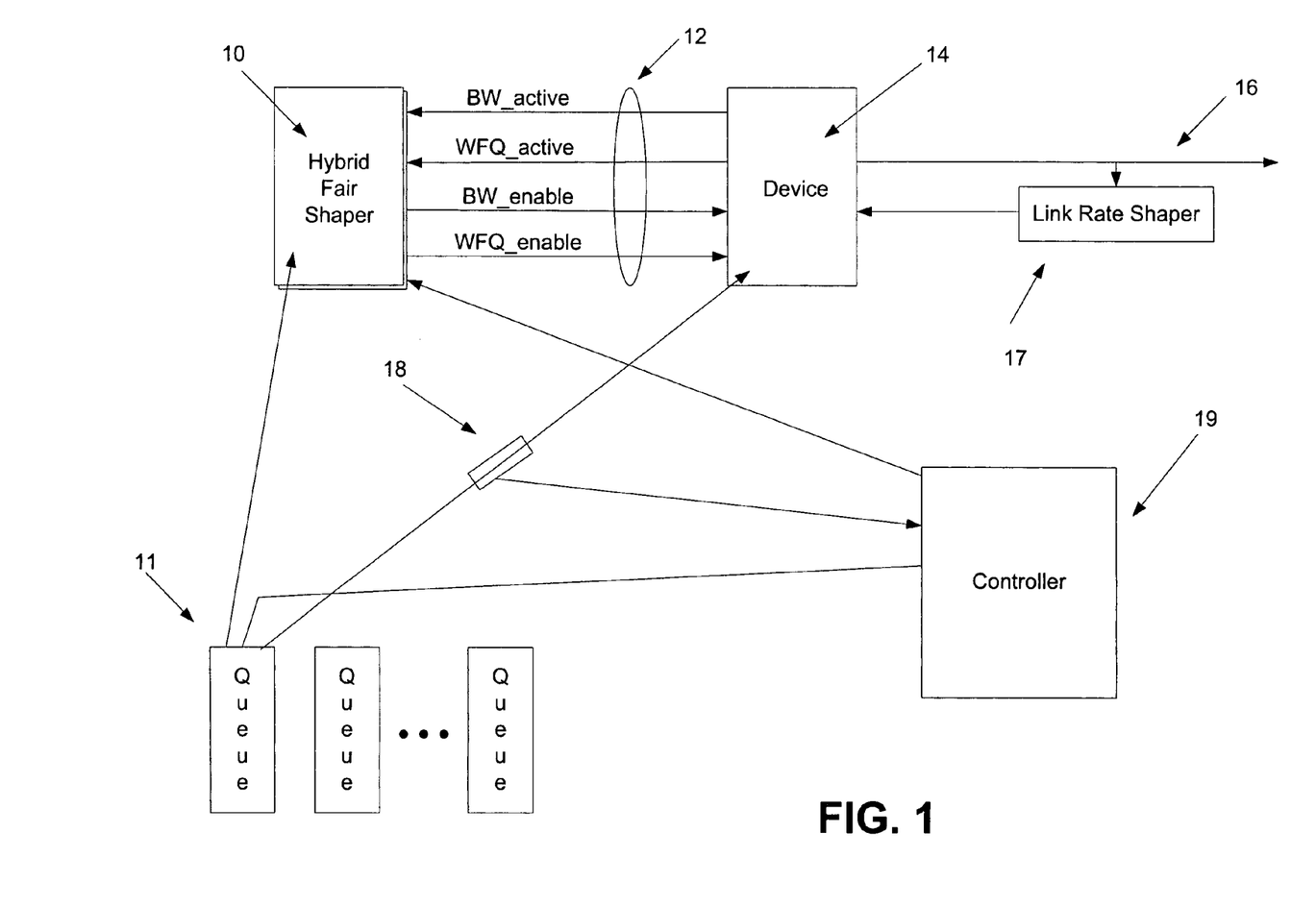
FIG. 1 illustrates a block diagram of a system embodying the invention.

FIG. 1 illustrates the overall structure of the preferred embodiment where each of eight Hybrid Fair Shapers, one of which is illustrated at 10, and each monitoring a queue (one of which is illustrated at 11), communicate via communication lines 12 with a controlling device 14. The device 14 receives packets from the queues (11) in a controlled manner and transmits these on a transmission medium 16. The bandwidth transmitted by each queue 11 is monitored by a bandwidth monitor 18 (of which one is provided for each queue).

The overall bandwidth transmitted on the medium 16 is monitored by a link rate shaper 17 which feeds back information on available bandwidth to the device 14 so that the bandwidth of the medium 16 may always be used. The bandwidth on the medium 16 may vary due to a number of factors, such as congestion at a receiving networking element also connected to the medium 16.

Each shaper 10 receives a queue-not-empty signal from its pertaining queue 11 in each cycle as described below. Each shaper 10 provides two types of signals (BW_enable and WFQ_enable) to the device 14.

The BW_enable signal signals to the device 14 that, according to a Leaky Bucket process, the pertaining queue wishes to transmit a packet in order to obtain its guaranteed bandwidth on the medium 16. Any number of the queues can have BW_enable signals activated at the same time.

A Leaky Bucket may be realized as a number reduced by a given drop rate each clock cycle and increased by a predetermined amount each clock cycle a data packet is transmitted from the pertaining queue. Also, the Leaky Bucket has a threshold above which the queue is not allowed to transmit a data packet. However, over time the number will decrease until it reaches the threshold and the BW_enable signal is set. Transmitting a data packet will increase the bucket level (the number), and if the packet transmitted is large enough, the bucket level may be higher than the threshold again. If not, the BW_enable signal will remain in order for the queue to again transmit a packet.

The WFQ_enable signal signals to the device 14 that the pertaining queue is the next queue to send a packet when the Leaky Bucket processes do not take up the full bandwidth of the medium 16. Only one queue can have a WFQ_enable signal at the time.

The device 14, receiving the BW_enable and WFQ_enable signals from the shaper, will determine which device (that is, which queue) is to transmit data when a present data packet has been transmitted. This determination is performed after the priority of BW 0, BW 1, ... BW 7, WFQ 0, WFQ 1, ... WFQ 7. Thus, data is always transmitted under the guaranteed bandwidth if the schedulers 10 have such data to transmit. Otherwise, data (if present) is transmitted from the Weighted Fair Queueing process. Please note that the priority between the WFQ queues is not relevant in that only one thereof can have the WFQ_enable signal on.

In return, each shaper receives a BW_active and a WFQ_active signal from the device 14. These signals inform the shaper of when the pertaining queue is transmitting under the bandwidth guaranteeing process or the weighted fair queuing process (or not at all).

Figure 2:
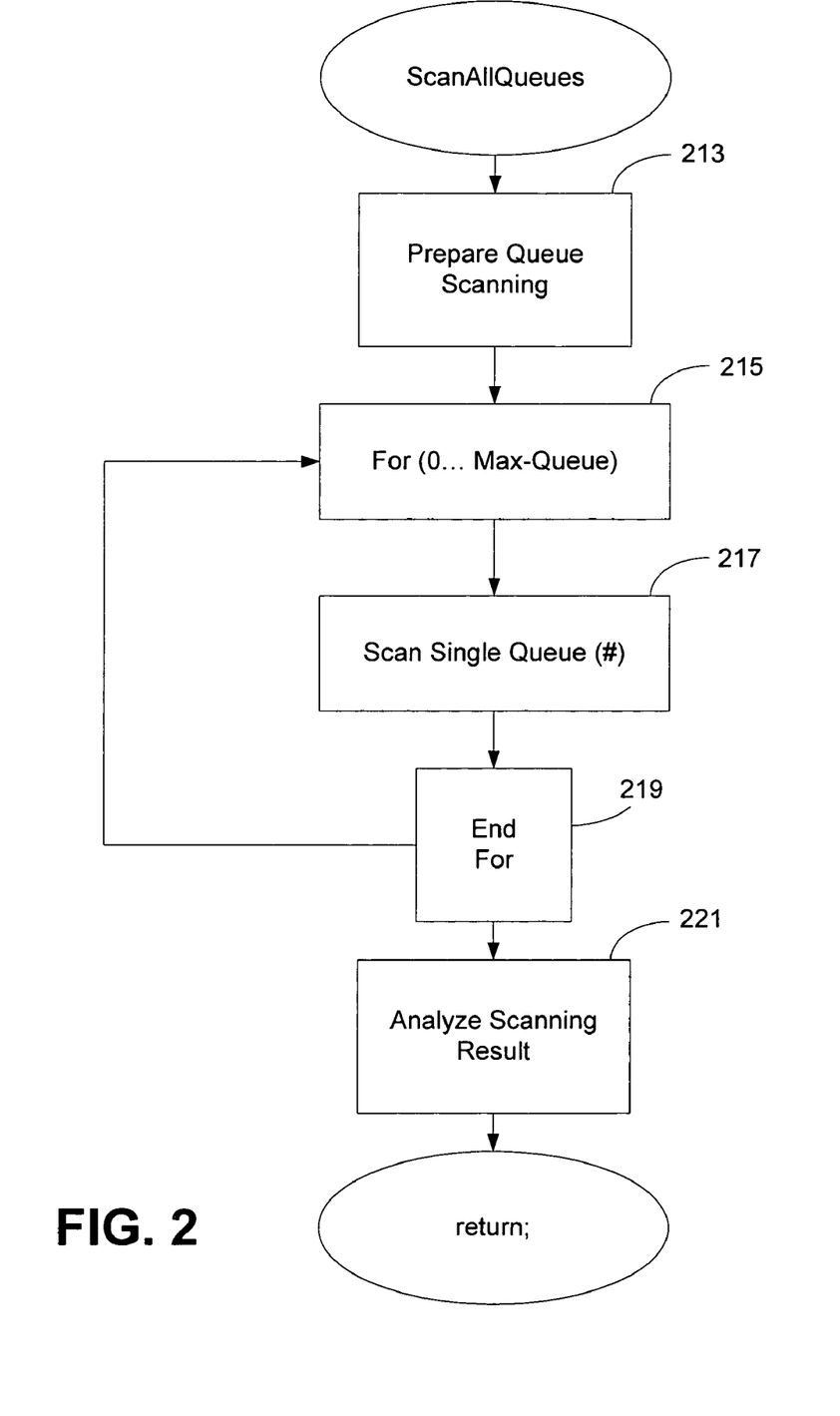
FIG. 2 is a flow diagram of an outer loop performing part of the monitoring.
Figure 3:
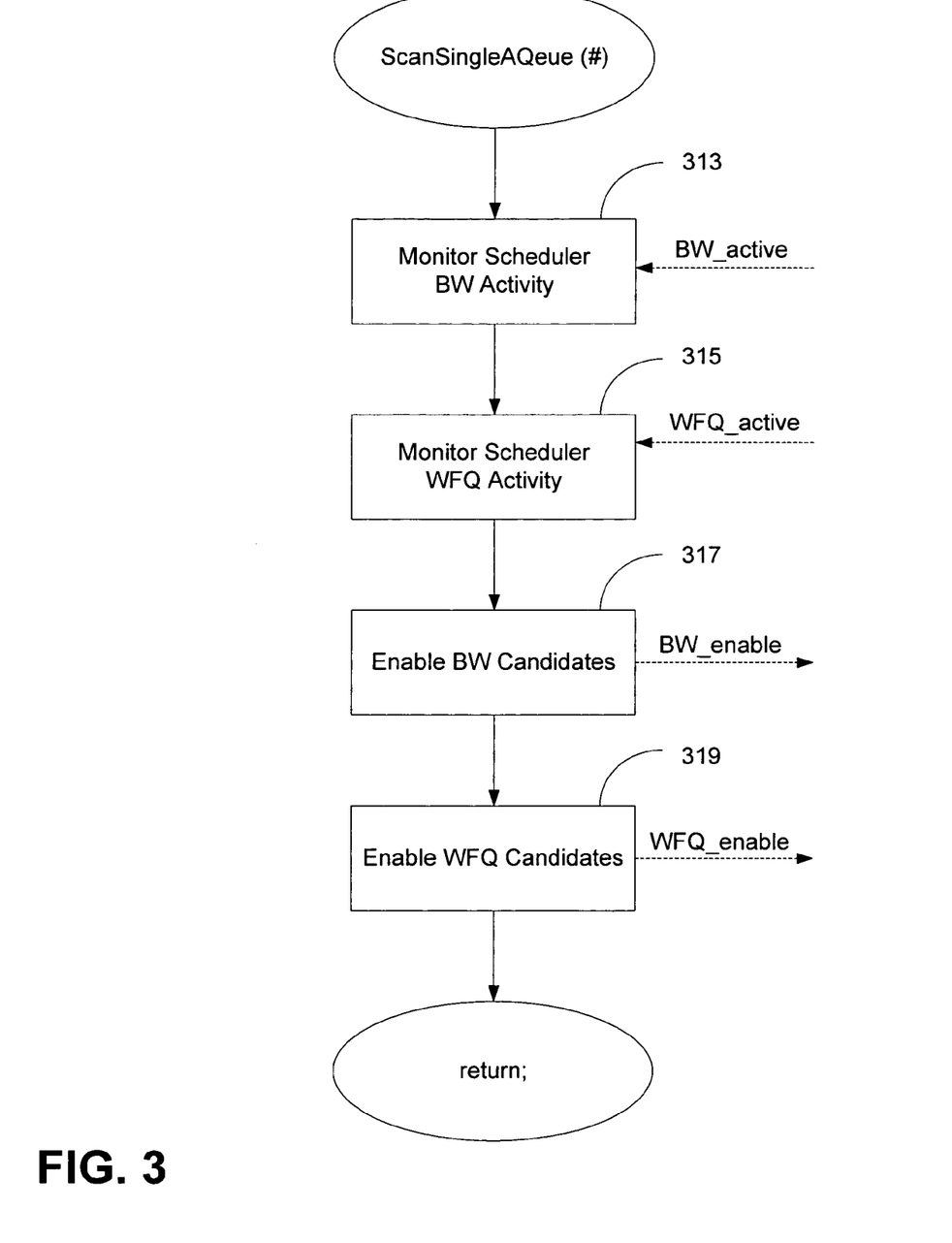
FIG. 3 is a flow diagram of an inner loop relating to a single queue.
Figure 4:
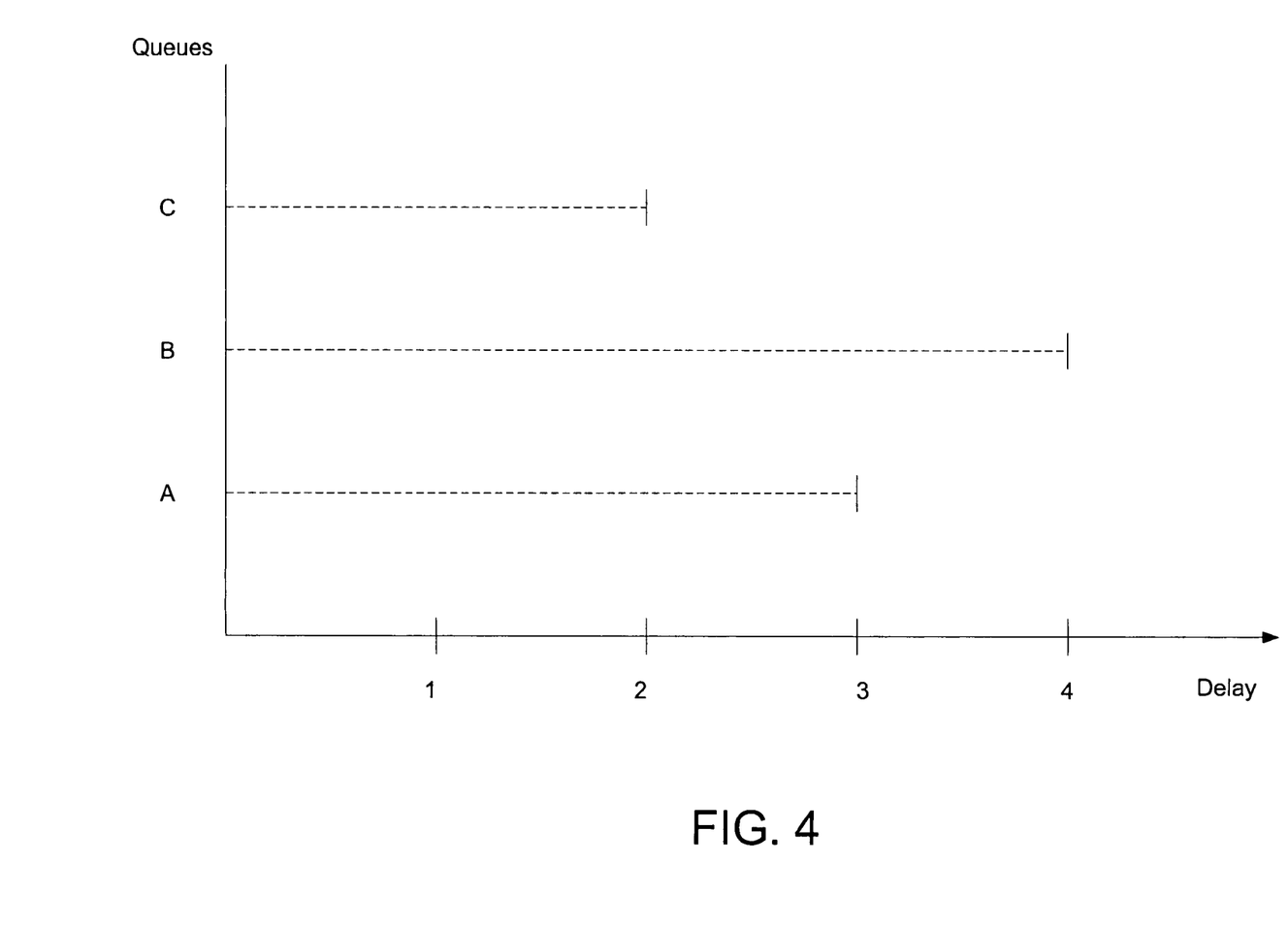
FIG. 4 illustrates the function and timing of the WFQ.

The actual process taking place in each of the shapers 10 is illustrated on FIGS. 2-4 and comprises an outer loop illustrated on FIG. 2, the outer loop scanning all queues (including itself) during one time slot (11 clock cycles), and an inner loop illustrated on FIG. 3, the inner loop relating to a single queue and being performed during a single clock cycle. The frequency of the system being preferably 166 MHz. FIG. 4 illustrates the timing and function of the Weighted Fair Queuing.

The outer loop scans all individual queues and eventually results in a data packet being transferred from a queue 11 to the medium 16.

The outer loop comprises the steps of:

```
ScanAllQueues
        Prepare next loop 213
                Invalidate WFQ candidate register
                Invalidate normalizing offset minimizer register
        for (0.max_queue) 215
                ScanSignalQueue(#) 217
        end for 219
        Analyze scanning result 221
                if (No WFQ candidate already pending) AND
                        (WFQ Candidate is operationally enabled - member of the second
group)
                then
                        Enable WFQ candidate
                        Set normalizer offset to mm value from scanning
                end if
                return;
*): or maybe alternatively the number of bits/bytes transmitted
        The inner loop is as follows:
                ScanSingleQueue(#)
                        Monitor scheduler BW activity 313
                                // Increase bucket level if transmission is active
                                if (transmission active) then
                                        bucket level := bucket level + 1.0 *)
                                end if
                                bucket level := bucket level - configured drop rate
                                // Limit bucket level at zero to avoid negative level
                                if (bucket level negative) then bucket level := 0
                        Monitor scheduler WFQ activity 315
                                // Rearm departure timer if transmission is active
                                if (Scheduler is transmitting in a WFQ slot) then
                                        // Time slot utilized for this queue
                                        Departure time delay := current dep. delay + weight
                                        end if
                                end if
                        Enable BW candidates 317
                                if (data in queue) AND (bucket level below threshold) then
                                        Enable BW indication line // *)
                                end if
                        Enable WFQ candidates 319
                                // Apply normalizer to avoid departure timer overflow
                                Departure time delay := Departure time delay - Normalizer
                                                                                        offset
                                if (Departure time delay negative) then
```

-continued

```
                Departure time delay := 0
            end if
            // Look for a WFQ candidate (or a better one if we already
have one)
            if (WFQ mode enabled) AND (data in queue) AND
            (Departure time delay < normalizing offset minimizer
register)
            then
                normalizing offset minimizer register := Departure
time delay
                WFQ candidate: = <current queue>
            end if
        return;
*): Please note that most of the variables in the inner loop exist in one copy per queue.
```

Also, please note that all queues may have an active BW tx indication line at the same time, while only one WFQ tx indication line can be active at any time. (Remember the scheduler priority: BWO . . . BWn . . . WFQ0 . . . WFQn).

In each time slot of the process, each of the queues is scanned as illustrated in FIG. 3 where the Leaky Bucket level is adjusted step 313 according to the drop rate of the bucket and taking into account whether the device 14 is transmitting a data packet (in accordance with the Leaky Bucket process) from that actual queue. The resulting bucket level or number is compared to the bucket threshold and the BW_enable signal set accordingly 319

The Weighted Fair Queuing (WFQ) is handled by steps 315 and 319 and works as follows:

The WFQ divides bandwidth not used by queues reserving bandwidth via the Leaky Bucket processes between queues wishing to transmit over the WFQ channel.

Each queue wishing to transmit over the WFQ channel is assigned a "weight" which is a number inversely related to a priority, quality level, or desired fraction of excess bandwidth to be made available for the given queue.

For each queue wishing to transmit over the WFQ channel, a Departure time delay is calculated. The Departure time delays of the queues define which of the queues is to be the next to use the WFQ channel. These delays are initially assigned a value corresponding to the weight of the queue and when a queue transmits a WFQ data packet over the medium 16, the pertaining delay is added to the weight each time slot where the queue is transmitting the data packet 315. An alternative process would be one where the weight is added each time a predetermined number of bits or bytes has been transmitted from the queue.

In this manner, the transmitting queue obtains a new delay with a higher number. After that, it is to be determined which queue is to transmit the next time—the queue now having the lowest delay 319.

Thus, it is clear that the values of the Weighted Fair Queuing process (weights and Departure time delays) are not altered when guaranteed bandwidth data is transmitted. One might say that time has been stopped when guaranteed bandwidth data is transmitted. In this manner, the WFQ process is simply restarted after a BW process has ended (and when no other BW data are waiting). However, in order to avoid timer overflow, the delay values may be reduced by a factor (preferably by the same value—Normalizer offset). Naturally, this normalization or reduction may be performed in any manner desired (subtraction or division). However, subtraction will ensure the same order of the queues and will therefore not interfere with the process.

FIG. 4 illustrates an example of this WFQ wherein three queues, A, B, and C wish to transmit data over the WFQ channel. The queue A has a WFQ weighting—or a configured departure time—of 1 whereas those of queues B and C are 2. In practise, this means that A wishes to transmit twice the amount of data, compared to queues B and C, over the WFQ channel.

Initially, the delays of all three queues are assigned to zero. Subsequently, it is determined which queue is the first to transmit a data packet. This queue is that with the smallest delay, and if more queues have the same delay, that found first taken in a given order. In this situation, queue A is the first to transmit data.

Queue A is now allowed to transmit a data packet over the medium 16. For each time slot this transmission takes, the current delay of A is added to the configured departure time of A. Thus, when A has transmitted a data packet over a total of three time slots, the delay of A will be 3.

Subsequently, the next queue to transmit a data packet will be determined. There are now two candidates, B and C and the first of these—B is selected. B now transmits a data packet taking two time slots to transmit. The resulting delay of B will subsequently be 4.

After that, C will be allowed to transmit a data packet. If C transmits a packet taking only one time slot to transmit, its final delay will be 2. Then, even though C was the last queue to transmit, it transmitted a so small packet that it still has the smallest delay. Therefore, C will be the next to transmit a packet.

Preferably, at the end of each time slot, all delays are reduced with the same amount so that the smallest delay(s) is/are zero. This is in order to avoid the risk of buffer overflow when these numbers become too high.

Now, the device 14, when determining from which queue a next data packet is to be transferred to the medium 16, firstly checks whether a queue wishes to send a LB packet—that is, if a queue wishes to use bandwidth reserved to it. If this is not the case, the WFQ channel is available, and the next queue is chosen to be that having the smallest delay. If the LB channel is used, the WFQ channel—and all delays thereof—will remain unchanged.

It is evident that A will be able to transmit twice as much data as B and C in the WFQ channel. Also, it is clear that no queue will be blocked for a longer period of time. If a queue transmits a large data packet, it will take that much longer time before it is allowed to transmit again.

Also, it is evident that data is only transmitted over the WFQ channel when the device 14 determines that there is available bandwidth on the medium 16.

In addition, it is interesting to note that the same queue may, in fact, transmit packets enabled both by a Leaky Bucket process and a WFQ process.

FIGS. 5-8 illustrate different tests of the present embodiment combining the Weighted Fair Queuing (WFQ) and a Leaky Bucket (LB) process.

Figure 5:
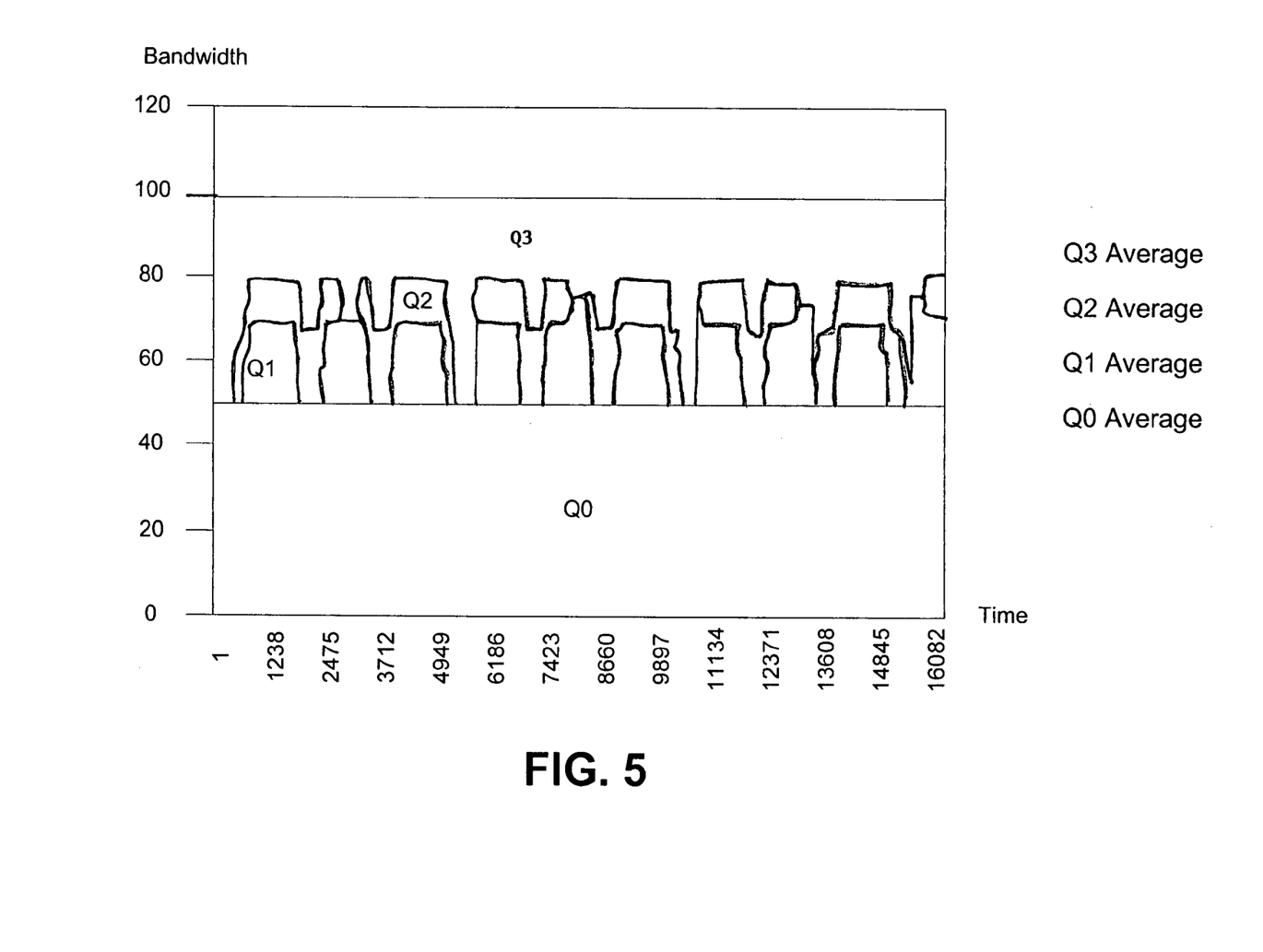
FIGS. 5-8 illustrate different examples of the operation of the invention.

In FIG. 5, 4 queues (#0, #1, #2, and #3) are defined each having a Leaky Bucket contribution with a transmit threshold (xmit_tresh) a drop_rate (drop_rate—a drop_rate of 0 indicating no LB contribution), a Weighted Fair Queue fraction (wfq_slot_dist scaling inversely with the fraction of total amount of transmission opportunities—a fraction of 0 indicating no WFQ contribution) as well as traffic generator flow data such as packet size (size), number of packets added to each queue (by a traffic generator) in one burst (count), and a period of time to lapse between the traffic generator adds packets to the queue).

Each queue #0, #1, #2, and #3 transmits packets of a size taking 1 time slot to transmit, #0 and #3 wishing to transmit (one packet at the time) at time 0 and #1 and #2 wishing to transmit 250 packets with a delay of 500, and the queues having WFQ fractions 0, 4, 8, and 4, respectively (0 meaning a disabled WFQ contribution).

The actual data are as follows:

•SHAPER CONFIGURATION
••//### QUEUE 0 ###
•xmit_tresh    = 0.75; •drop_rate    = 0.5;wfq_slot_dist = 0;
••//### QUEUE 1 ###
•xmit_tresh    = 0; •drop_rate    = 0; •wfq_slot_dist = 4;
••//### QUEUE 2 ###
•xmit_tresh    = 0; = 0; •drop_rate    = 0; •wfq_slot_dist = 8;
••//### QUEUE 3 ###
•xmit_tresh    = 0;•drop_rate    = 0;•wfq_slot_dist = 4;

| TRAFFIC GENERATOR FLOWS | | |
|---|---|---|
| R26; Queue_no/ | Size/Count/Delay | |
| #0 | 1 | 1 | 0 |
| #1 | 1 | 250 | 500 |
| #2 | 1 | 250 | 500 |
| #3 | 1 | 1 | 0 |

Thus, #1, having a fraction of 0, is a Leaky Bucket-only queue having reserved half the bandwidth of the transmission medium. From FIG. 5 it is seen that #0 (00) uses/blocks half the bandwidth of the transmission medium.

The remaining bandwidth is divided between #1, #2, and #3 not having Leaky Bucket contributions but having different WFQ fractions. From FIG. 5 it is seen that between time=0 and time=500, only #3 transmits packets via the WFQ.

At time=500, both #1 and #2 now contain data packets and therefore wish to transmit. Due to the differences in WFQ fraction, the 50% of the bandwidth (not reserved by #0) is divided into two parts for each of #1 and #3 and one part for #2.

Due to the different WFQ fractions, #1 and #2 will have transmitted the 250 packets at different points in time. Each of these queues will delay 500 time slots and then again receive 250 packets.

Due to #3 transmitting only one packet at the time and due to it having a WFQ fraction equal to that of #1 and twice (the WFQ fraction being inverted in relation to the integer representing it) that of #2, it is seen that when #1 and #3, only, transmit, they divide the bandwidth equally. When #2 and #3, only, transmit, they divide the bandwidth so that #3 has twice the bandwidth compared to #2.

Consequently, the bandwidth remaining from the LB transmission is divided on a Byte Fairness basis in accordance with the WFQ fractions of the queues.

Figure 6:
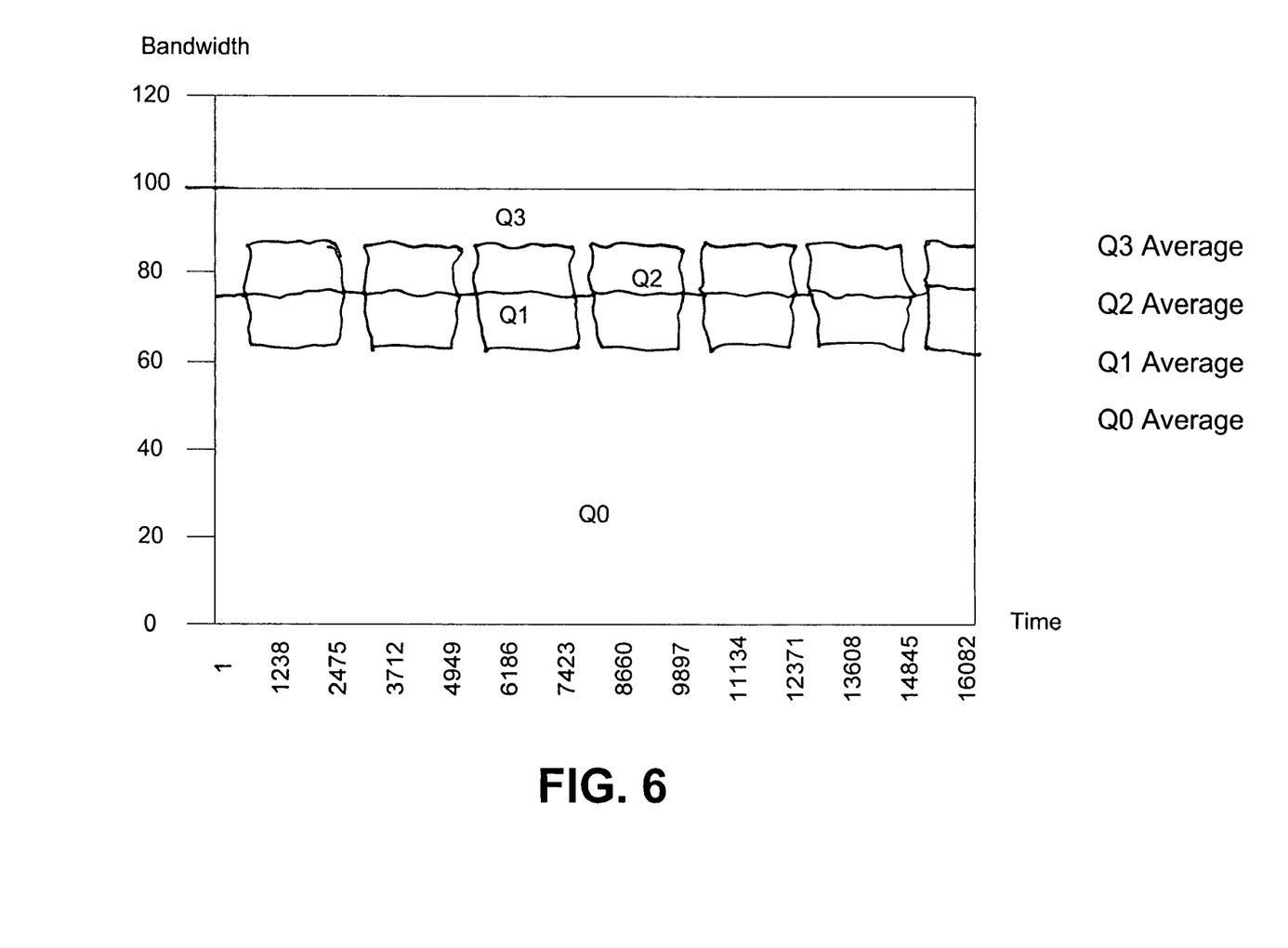

On FIG. 6, all queues have been assigned a WFO fraction of 4. However, #0 is still the only LB queue—still blocking 50 of the bandwidth with its LB contribution. However, now #0 also takes part in the sharing of the remaining 50% of the bandwidth. The actual data are:

•SHAPER CONFIGURATION
••// ### QUEUE 0 ###
•xmit_tresh    = 0.25;•drop_rate    = 0.5;•wfq_slot_dist = 4;
••// ### QUEUE 1 ###
•xmit_tresh    = 0;•drop_rate    = 0; •wfq_slot_dist = 4;
••// ### QUEUE 2 ###
•xmit_tresh    = 0;•drop_rate    = 0; •wfq_slot_dist = 4;
••// ### QUEUE 3 ###
•xmit_tresh    = 0;•drop_rate    = 0; •wfq_slot_dist = 4;

| TRAFFIC GENERATOR FLOWS | | |
|---|---|---|
| R26; Queue_no/ | Size/Count/Delay | |
| #0 | 1 | 1 | 0 |
| #1 | 1 | 250 | 500 |
| #2 | 1 | 250 | 500 |
| #3 | 1 | 1 | 0 |

Figure 7:
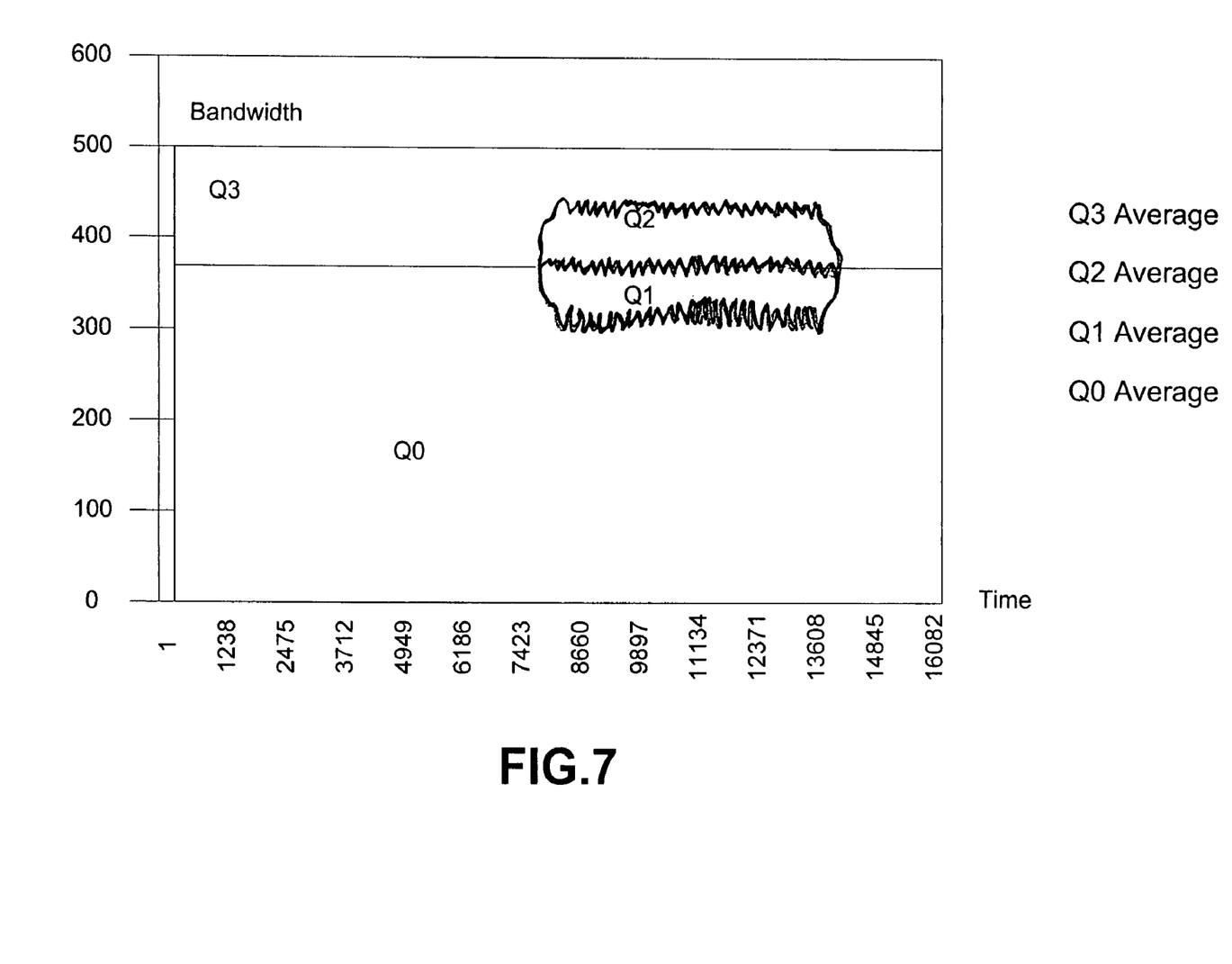

In FIG. 7, the largest difference is that now two of the queues transmit data packets of a size, which takes 24 time slots to transmit. In this situation, transmitting such a data packet will make the LB level of #0 drop during transmission. Therefore, xmit_tresh has a value of 25 in order to "accommodate" this situation. Otherwise, it is again seen that the overall bandwidth is shared in accordance with the different values.

The data are:

•SHAPER CONFIGURATION
••//### QUEUE 0 ###
•xmit_tresh    = .75;•drop_rate    = 0.5; •wfq_slot_dist = 4;
••//### QUEUE 1 ###
•xmit_tresh    = 0; •drop_rate    = 0; •wfq_slot_dist = 4;
••//### QUEUE 2 ###
•xmit_tresh    = 0; •drop_rate    = 0; •wfq_slot_dist = 4;
••//### QUEUE 3 ###
•xmit_tresh    = 0; •drop_rate    = 0; •wfq_slot_dist = 4;

| TRAFFIC GENERATOR FLOWS | | |
|---|---|---|
| R26; Queue_no/ | Size/Count/Delay | |
| #0 | 1 | 1 | 0 |
| #1 | 24 | 32 | 8000 |
| #2 | 24 | 32 | 8000 |
| #3 | 1 | 1 | 0 |

Figure 8:
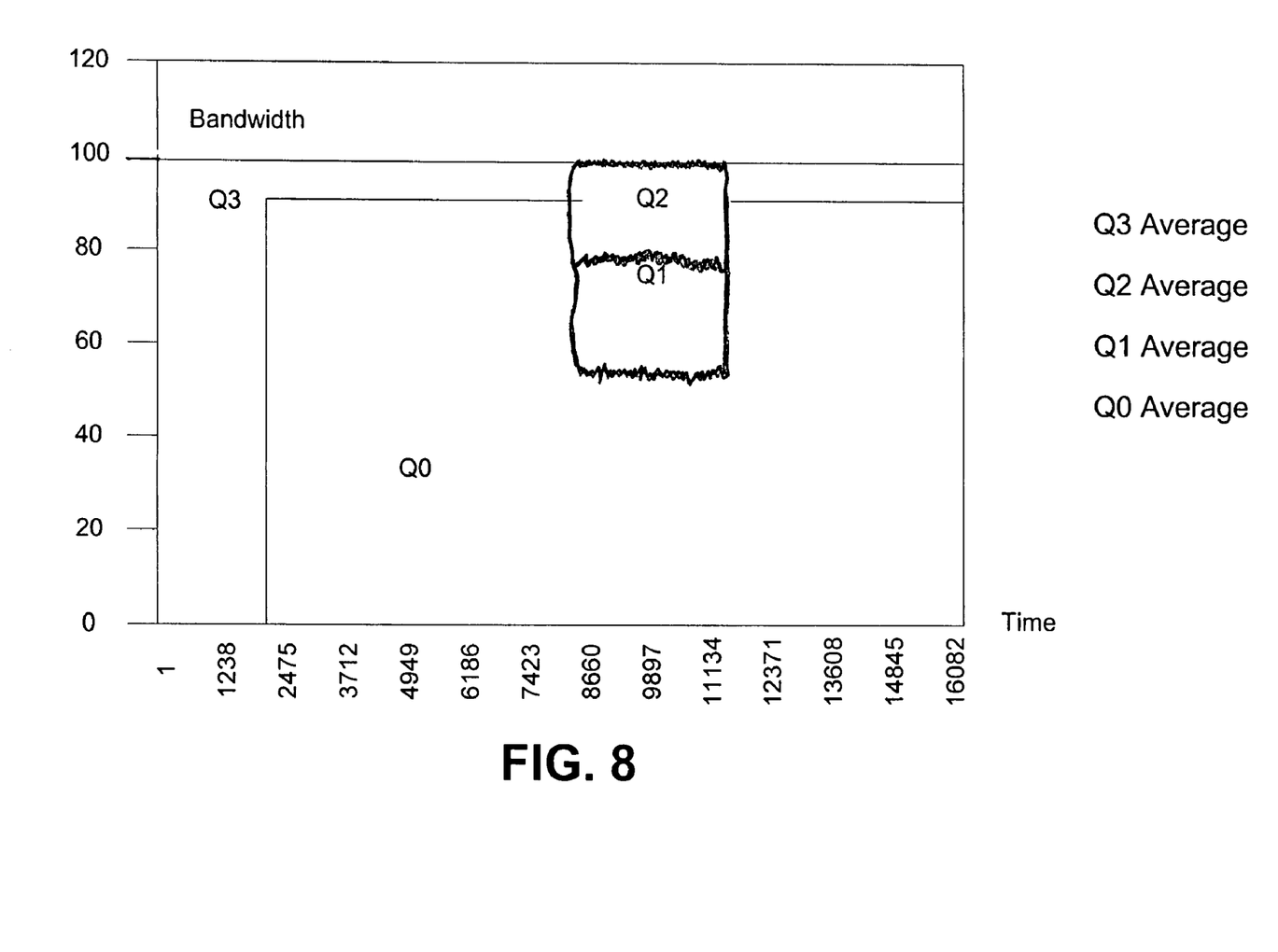

In FIG. 8, #0 is still the only LB queue still reserving 50% of the bandwidth but now not transmitting until a delay of 2000. Also, delay, size, count and WFQ fractions have been altered:

| •SHAPER CONFIGURATION |
| --- |
| ••// ### QUEUE 0 ### |
| •xmit_tresh = 25•drop_rate = 0.5; •wfq_slot_dist = 16; |
| ••// ### QUEUE 1 ### |
| •xmit_tresh = 0;•drop_rate = 0; •wfq_slot_dist = 1; |
| ••//### QUEUE 2 ### |
| •xmit_tresh = 0;•drop_rate = 0;•wfq_slot_dist = 1; |
| ••//### QUEUE 3 ### |
| •xmit_tresh = 0;•drop_rate = 0;•wfq_slot_dist = 64; |

| TRAFFIC GENERATOR FLOWS | | | |
| --- | --- | --- | --- |
| R26; Queue_no/ | | Size/Count/Delay | |
| #0 | 1 | 16384 | 2000 |
| #1 | 24 | 32 | 8000 |
| #2 | 24 | 32 | 8000 |
| #3 | 1 | 1 | 0 |

In this situation where all but #3 start with delays, #3 will have the full bandwidth until #0 starts reserving firstly its 50% of the bandwidth (LB) and additional bandwidth due to its higher WFQ fraction (compared to that of #3).

At time 8000, #1 and #2 start transmitting with higher WFQ fractions whereby the transmission of #3 is reduced to only $1/133$ of the bandwidth (during 64 WFQ steps, #0 will transmit 64/16=4 times, #1 and 2 64 times each and #3 a single time—assuming all packets can be sent in one time slot).

Consequently, it is seen that the invention provides a WFQ scheme, which may be combined with e.g. a LB scheme while still providing fair sharing of a bandwidth. Also, it is seen that the implementation of the schemes is quite simple and ASIC friendly in that no multipliers are required.

Returning to FIG. 1, operation of the system in order to bill the users of the queues or 10 simply monitor the bandwidth use will now be described.

The bandwidth monitors 18 provide bandwidth use information to a controller 19 which enforces the bandwidth policies of the individual queues and controls the processes of the shapers 10. This may be performed in a number of manners.

A queue may be allowed to use up to a particular upper bandwidth while only a smaller bandwidth is guaranteed. The remaining bandwidth is obtained using the weighted fair queuing process. However, the bandwidth available will be limited even though the queue has more data to send and there is bandwidth on the medium 16. This may be the situation where a fixed amount of bandwidth is paid for by the user of the queue in question. In this manner, when the upper bandwidth has been used, the controller 19 may increase the weighted fair queuing weight of the queue in a manner so that only very seldom—or never—is a packet transmitted by that process. At a later point in time when more bandwidth can be provided to the queue, the weight may be reduced again. In this manner, the guaranteed bandwidth is always guaranteed as a minimum and only the availability of the "excess bandwidth" is changed.

The bandwidth monitors may also simply be used for determining the bandwidth used for billing a user of a queue.

Also, the controller 19 may calculate a historic bandwidth use and alter the weighted fair queuing weight if a queue has not used all of its guaranteed (and thereby probably paid for) bandwidth. This would be the situation where the queue for a period of time has not had enough data to fill up the guaranteed bandwidth. Naturally, the weighted fair queuing process will take advantage of that so that, as long as there is data to transmit, the bandwidth of the medium 16 may be fully used. However, the queue not having had all the guaranteed bandwidth may later on have more data and then desire to actually transmit more data than the guaranteed bandwidth. Then, the controller 19 may adjust a weighted fair queuing weight of that queue to have that queue take up more of the non-guaranteed bandwidth so that the queue is able to burst data out and regain lost bandwidth. Naturally, this is in addition to the guaranteed bandwidth of the queue.

The guaranteed bandwidth process of the queue may be able to take into account—to a certain degree—the fact that too little bandwidth has been used. Using a normal leaky bucket process, the parameters of the leaky bucket may take that into account. However, a number of disadvantages will be seen if the bucket is amended to take into account a larger loss of bandwidth over a longer period of time. This, however, is easily determined and calculated by the controller 19.

In this context, it should be noted that bandwidth used should be determined over a period of time in that only a single queue can send at the time over a single medium. Naturally, a trunk or aggregated medium will be able to send data on parallel media, but the overall bandwidth should still be determined over a period of time. Thus, also the controlling of bandwidth and parameters for the processes should take that into account. This is obvious to the skilled person and will not be further described here.

The invention claimed is:

1. A method of transmitting information packets from a plurality of queues into a single transmission medium, wherein the packets may have different sizes, the method comprising:
   a bandwidth guaranteeing process transferring packets from one or more queues to the transmission medium in a manner so that each of those queues can obtain at least a predetermined bandwidth, and
   a queuing process comprising the steps of:
   1. assigning a priority to each of the queues not using the bandwidth guaranteeing process;
   2. defining, for each of the queues not using the bandwidth guaranteeing process, a variable, and
   3. for the queues not using the bandwidth guaranteeing process, when no queues using the bandwidth guaranteeing process transmit packets;
   determining a first queue having a variable with a value fulfilling a predetermined criterion,
   transmitting a packet from the first queue to the transmission medium, and
   determining a new value for the variable of the first queue, the new value based on a mathematical operation using a previous value for the variable at a point in time prior to transmission of the packet and a factor scaling the priority of the first queue multiplied with a factor relating to a size of the packet transmitted from the first queue, the new value not fulfilling the predetermined criterion.

2. A method according to claim 1, wherein the step of transmitting the data packet comprises transmitting the packet in accordance with a periodic timing signal and wherein the step of determining the new value for the first queue comprises, during transmission and for each period of the timing signal, providing a new value for the variable by performing the predetermined mathematical operation on a previous variable value and a factor scaling with the priority of the first queue.

3. A method according to claim 1, further comprising the step of determining a bandwidth used for at least one of the queues.

4. A method according to claim 3, further comprising the step of altering, on the basis of the bandwidth used by a queue, a parameter of the bandwidth guaranteeing process for the queue.

5. A method according to claim 3, further comprising the step of providing information to an operator of the bandwidth used.

6. A method according to claim 1, wherein the step of defining the variable comprises defining an integer value relating to a priority or quality of each queue.

7. An apparatus for transmitting information units or packets from a plurality of queues into a single transmission medium, wherein the units or packets may have different sizes, the apparatus comprising:
    bandwidth guaranteeing means for transferring units from one or more queues to the transmission medium in a manner so that each of those queues can obtain at least a predetermined bandwidth, and
    queuing means comprising:
        1. means for assigning a priority to each of the queues not using the bandwidth guaranteeing process,
        2. means for defining, for each of the queues not using the bandwidth guaranteeing process, a variable, and
        3. means for, when no queues using the bandwidth guaranteeing process transmit packets;
    determining a first queue having data and having a variable with a value fulfilling a predetermined criterion,
    transmitting a packet from the first queue to the transmission medium, and
    determining a new value for the variable of the first queue, the new value relating to a mathematical operation using a previous value for the variable at a point in time prior to transmission of the packet and a factor scaling the priority of the first queue multiplied with a factor relating to a size of the packet transmitted from the first queue, the new value not fulfilling the predetermined criterion.

8. An apparatus according to claim 7, wherein the means for transmitting the data packet comprises means for transmitting the packet in accordance with a periodic timing signal and wherein the means for determining the new value for the first queue comprise means for, during transmission and for each period of the timing signal, providing a new value for the variable by performing the predetermined mathematical operation on a previous variable value and a factor scaling the priority of the first queue.

9. An apparatus according to claim 7, further comprising means of determining a bandwidth used for at least one of the queues.

10. An apparatus according to claim 9, further comprising means for altering, on the basis of the bandwidth used by a queue, a parameter of the bandwidth guaranteeing means for the queue.

11. An apparatus according to claim 9, further comprising means for providing information to an operator of the bandwidth used.

12. An apparatus according to claim 7, wherein the means for defining the variable comprises means for defining an integer value relating to a priority or quality of each queue.

* * * * *